3,493,502
PROCESS FOR FLOCCULATING
AQUEOUS SUSPENSIONS
Anthony Thomas Coscia, South Norwalk, Conn., assignor to American Cyanamid Company, Stamford, Conn., a corporation of Maine
Filed Feb. 19, 1968, Ser. No. 706,592
Int. Cl. C02b 1/20; C02c 1/00
U.S. Cl. 210—54     4 Claims

ABSTRACT OF THE DISCLOSURE

A polymeric flocculant for the dewatering and/or settling of aqueous suspensions of finely divided solids, such as sewage sludge and industrial process and waste water, is produced by reacting methylamine with epichlorohydrin and advancing the reaction, under alkaline conditions in the presence of water, substantially to the point of incipient gelation of the reaction mixture; the amount of water present during the advancement being such that the final polymer solids content of the reaction mixture is from about 10% to about 30%.

---

Figure 1:
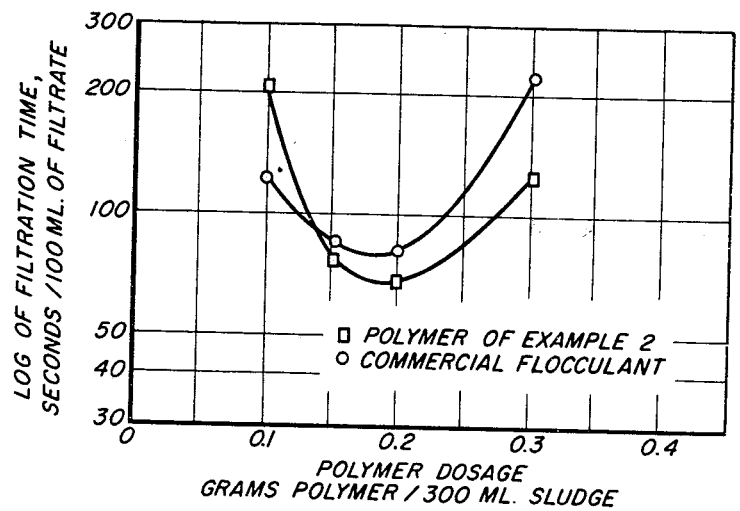

The present invention relates to the flocculation of solid matter in aqueous systems and to a flocculant therefor. More particularly, the invention is concerned with the provision of a water-soluble, chemically stable, cationic cross-linked polymer which is a highly versatile flocculant. The polymer is highly effective for the flocculation of suspended particles, both organic and inorganic, in aqueous dispersions, including municipal wastes, such as sewage, sludge, and various industrial process and waste waters.

The separation of the suspended solids in aqueous systems is a problem of considerable importance. For example, present anti-pollution laws require that the solids content of waste water be reduced to a fixed maximum value before discharge into a river or stream. In many cases, the solids are present in the waste water as negatively-charged colloids requiring costly and difficult treatment prior to disposal. Because of the stability of the suspensions and the small size of the suspended particles, sedimentation and filtration procedures are relatively ineffective without prior flocculation of the suspended matter. Municipal sewage treatment and disposal for example requires the separation of large quantities of water from the solid matter present in sewage sludges. Such large water loads together with the intractable nature of the solids involved have made sedimentation and filtration of the sludges slow, difficult and costly.

Another difficult industrial problem is the clarification of industrial wastes which would otherwise cause pollution of lands and streams. Thus, wastes, resulting from industrial operations, such as coal mining, ore processing, chemical plants and the like, comprise suspensions of finely divided solids in water. These suspensions remain stable for days so that if the solids are not removed, the water cannot be reused and a disposal problem is presented.

Certain processing steps in the beneficiation of ores result in the production of large quantities of fines (or slimes) through attrition grinding, with a resultant accumulation of ore values in the slimes. The ore is then concentrated through a hydraulic classification of the sands (waste) from the slimes (ore concentrate) and the slimes must in many instances be dewatered for further processing. Settling, filtration, or combinations of these processes are commonly practiced in the treatment of such slimes fractions and, here again, because of the fineness of the suspended particles such operations are often slow and costly. It has, therefore, been the practice to use chemical flocculating agents in an effort to agglomerate the slimes to afford larger particles which in a filtration operation have less tendency to plug the filter medium, or in thickening operations enhance the rate of fall of the slimes particles inasmuch as they have been agglomerated to larger particle size and, therefore, have more of a tendency to settle.

It is an object of this invention to provide a method for the rapid dewatering and/or settling of the suspended matter in various aqueous systems. It is a further object to provide a novel flocculating agent for this purpose. Other and further objects will be apparent from the following description.

In accordance with the present invention it has now been found that a polymeric product which is an excellent flocculating agent can be obtained by the condensation of methylamine with epichlorohydrin in the presence of water, provided the reaction is carried out under dilute conditions and that the reaction is maintained alkaline. Thus, in accordance with the invention, the reaction, at least in a final stage, is carried out or "advanced" to a defined extent, viz., to a point approximating the gelation point at a defined low polymer solids content in the alkaline reaction mixture. Thus, the final polymer product results directly from the advancement of the reaction to a point close to the gel point in the presence of sufficient water, as solvent, to provide a polymer solids content of from about 10% to about 30% in the final product mixture. As will be seen, however, the reaction may be advanced in one or more preliminary stages of higher solids content, i.e., above about 30% solids, followed by advancement in a final low, i.e., from about 10 to about 30%, solids content stage; or, the entire advancement to the final polymer product may be effected in a single low solids content stage.

The terms "solids content" and "polymer solids content" as used herein mean the weight percentage of polymer (or polycondensate) product present in the reaction mixture in any given stage of the process. It is calculated on the assumed basis that all of the chlorine of the epichlorohydrin is held as counter-ion by the polymer product, except that which has been converted to metal chloride by the alkali metal hydroxide added to the reaction. Thus, it will be seen then that the "solids content" in any advancement stage will depend on, and can be easily controlled by, the amount of water present in the reaction mixture at that stage and the total amount of alkali which has been added to the reaction mixture in that stage and any preliminary stage.

In carrying out the epichlorohydrin-methylamine reaction to form the flocculant polymer of the invention, the epichlorohydrin is added slowly and cautionsly, with stirring, to the aqueous amine. The reaction is exothermic so that it is advantageous to employ cooling during the addition. When all of the epichlorohydrin has been added, sufficient caustic solution (such as 50% sodium hydroxide) is then added cautiously to make the mixture alkaline. The reaction is then progressed (i.e., advanced) by heating at a temperature of 40–100° C., preferably, 50–75° C., with incremental additions of caustic to maintain the pH alkaline, until the viscosity is close to the point of incipient gelation. The mixture is then cooled and acidified to bring the pH to 3–4.

Since the gel point of the reaction mixture will vary depending on the solids content thereof, the particular heating temperature, etc., it is necessary to determine it by trial. Thus, the viscosity of the reaction mixture (which increases as the reaction proceeds) is measured at intervals under an established set of conditions and the viscosity just prior to gelation is noted. The well known Gardner-Holdt method for viscosity measurement is suitable for this purpose. Alternatively, a Ford cup may be used.

Where the reaction is to be advanced to the formation of the polymer of the invention in a single stage (i.e., where no preliminary higher solids content stage is used) sufficient water is charged at the outset, along with the reactants to provide the required low solids content (about 10–30%) in the reaction mixture when the reaction is terminated.

Generally, the methylamine and epichlorohydrin are employed in the process in substantially equal mole proportions. However, a small excess, up to about 10 mole percent, of either reactant may be used without adverse effect.

In the course of the reaction, part of the chlorine of the epichlorohydrin is retained by the polymer product as counter-ion, the remainder being neutralized by the added caustic to metal chloride. At the same time, the added caustic is also sufficient to maintain the reaction mixture alkaline.

The condensation of epichlorohydrin with an alkylamine, such as methylamine has been known heretofore. Thus, the patent to Stallmann, U.S. No. 1,977,253, discloses such a condensation reaction. However, neither the reaction conditions of the instant invention (i.e., conducting the reaction under alkaline conditions in the presence of water at low solids content) nor a polymeric product as produced by the instant invention is shown in the patent. Also, a previous patent to the present applicant, U.S. No. 3,248,353, shows the condensation of epichlorohydrin with two amines, simultaneously, to form a cross-linked polymer useful as a retention aid in the manufacture of paper. In that case, one of the amines was a bifunctional amine, such as methylamine, and the other a polyfunctional amine, such as ethylenediamine. The patent does not suggest utilizing only a single amine (methylamine) in the reaction, or that a polymer could thus be produced by advancement of the reaction at low solids content, as herein prescribed.

While it is not intended to limit the present invention in any way by theoretical considerations, it is believed that under the prescribed conditions of the instant process the methylamine acts as both bifunctional and polyfunctional amine. Thus, it functions as a chain-forming component and as a cross-linking agent. Also, in contra-distinction to the polycondensation reaction involved in U.S. No. 3,248,353, a relatively small but significant number of quarternary groups are formed in the reaction of this invention. Thus, the polymer is believed to have the structure:

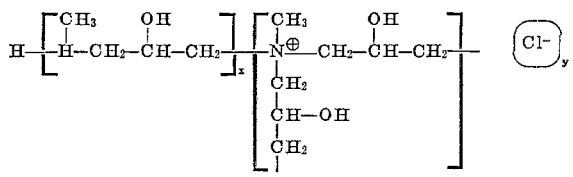

where X is relatively large compared to Y.

As is known by those skilled in the art, at the gel point in a polycondensation system, a relatively small proportion of the polymer molecules are of such large size that they constitute a 3-dimensional network extending as a matrix throughout the reaction system. As such (i.e., being insoluble) the polymer is useless as a flocculating agent. Apparently, however, under the prescribed conditions for advancing the reaction in accordance with the present invention, a higher proportion of the molecules attain a large size so that the polymer product is a more highly effective flocculating agent. By light scattering techniques it has been determined that the polymer products thus provided, have molecular weights in the neighborhood of 1-million which is unusual in a system such as the present one where the units involved (methylamine and epichlorohydrin) are so small.

The manner of practicing the invention and the utility of the polymer products afforded thereby as flocculants is fully illustrated by the following examples and tests.

EXAMPLE 1

In this example a polymer of the invention was produced by a process in which the condensation reaction was first advanced in a preliminary higher solids content stage and then in a second low solids content stage. It will be seen that the polymer obtained in the second advancement stage is a superior flocculant.

*Preliminary stage.*—To a 5-liter flask equipped with a condenser, stirrer, dropping funnel and thermometer and external cooling bath, there was introduced 287 grams (9.24 moles) of methylamine (775 g. of a 37% aqueous solution). There was then added drop-wise and cautiously over a period of 5 hours 850 grams (9 moles) of epichlorohydrin (98% purity) while maintaining the temperature of the mixture at 25–45° C. Next, 450 grams (4.5 moles) of sodium hydroxide (40% aqueous solution) were added drop-wise over a 2-hour period, the temperature being maintained at 60–80° C. At this point the polymer solution (40% solids) had attained a viscosity of "F" (measured at 25° C.) on the Gardner-Holdt scale. A sample of the product was withdrawn and acidified with 6 N sulfuric acid to reduce the pH to 4. (Product A.)

*Second (final) stage.*—To the product solution from A there was added 1413 grams of water. In this diluted condition the polymer solution had a Gardner-Holdt viscosity of A (measured at 25° C.) which represents the zero point for the advancement of the second stage of polymerization. The polymer solution was then heated at 60–80° C. for 2 hours at which point the solution (25% solids) had reached a viscosity of M on the Gardner-Holdt scale (measured at 25° C.). Sulfuric acid (6 N) was added to reduce the pH to 4. (Product B.)

Products A and B were evaluated in the well-known sludge dewatering-filtration test, described below, which measures the effectiveness of a material as a flocculating agent for industrial and domestic wastes.

Sludge dewatering-filtration test

The apparatus employed consists of a No. 2 Buchner funnel having the stem thereof fitted air-tightly to a volumetric cylinder through an adapter having a side-arm, connected to a gauged vacuum source. A No. 2 Whitman filter paper is placed in the funnel over a wire-mesh screen support. The procedure is as follows. 300 ml. of sludge is used in the test. The sludge is placed in a 400 ml. beaker. The flocculant, as 1% solution, is measured into a similar beaker. The sludge is then poured into the flocculant solution and the mixture is poured back and forth three more times to complete the mixing. The conditioned sludge is then transferred to the Buchner funnel (the filter paper in the funnel having been previously moistened and vacuum applied to obtain a seal). After 5–10 seconds form time, vacuum is applied and the time required to collect 100 ml. of filtrate is recorded.

The tests were conducted on a typical local (New Canaan, Conn.) municipal digested sewage sludge containing 4.3% solids. Both products were tested at dosages of 0.1 and 0.2 grams for 300 ml. of sludge. The tests showed Product A to be ineffective as a flocculant, the filter becoming clogged after only a few mls. of filtrate were obtained. Product B, however, was highly effective, giving a filtration time of 80 seconds (for 100 ml. of filtrate) at the 0.2 gram dosage level. By comparison, a commercial polyamine flocculant, tested at the latter level, gave a filtration rate of 100 seconds.

EXAMPLE 2

In this example a polymer of the invention was produced by advancement of the reaction in a single low solids content stage.

Into a 5-liter flask equipped with a condenser, stirrer, dropping funnel, thermometer and external cooling bath there was introduced 1743 grams of water and 642 grams of 40% aqueous methylamine solution (257 grams real of methylamine. There was then added drop-wise 782 grams of 98% epichlorohydrin, the temperature being maintained in the range of 25–45° C. The reaction mixture was then heated at 60–80° C. and 400 grams of sodium hydroxide (50% aqueous solution) was added incrementally to maintain the pH between 8.4 and 9.2 over a period of 5 hours. The heating was then continued for 1 hour until the viscosity of the mixture (21% solids) reached a Gardner-Holdt value of M (measured at 25° C.). 6 N sulfuric acid was then added to reduce the pH to 4 final solids content 19%).

The polymer product was evaluated in the sludge dewatering-filtration test (supra) on a typical digested sludge (4.3% solids) from a local (New Canaan, Conn.) sewage treating plant. Several concentrations of polymer were used in the tests and the logarithm of the time required for 100 ml. of filtrate to be obtained were plotted vs. polymer dosage. Tests were also conducted on a commercial polyamine flocculant as standard. The resulting curves are shown in FIGURE 1 of the accompanying drawings. It will be seen that at the most effective dosage for both the polymer of this example and the commercial flocculant, i.e., 0.2 gram per 300 ml. of sludge, the former showed a filtration rate of 68 seconds, while the latter showed a filtration rate of 80 seconds.

EXAMPLE 3

In this example, the procedure of Example 2 was followed, except that the reaction was advanced only to a viscosity of F on the Gardner-Holdt scale (about 70 centistokes) a point substantially short of the gel point. A sample of the product was removed and acidified with 6 N sulfuric acid to pH 4. It was labeled Product A.

Heating of the reaction mixture was then continued until the viscosity had advanced to a value of Y on the Gardner-Holdt scale (1500 centistokes), a point close to the gel point. The whole was then acidified to pH 4 with 6 N sulfuric acid. It was labeled Product B.

Figure 2:
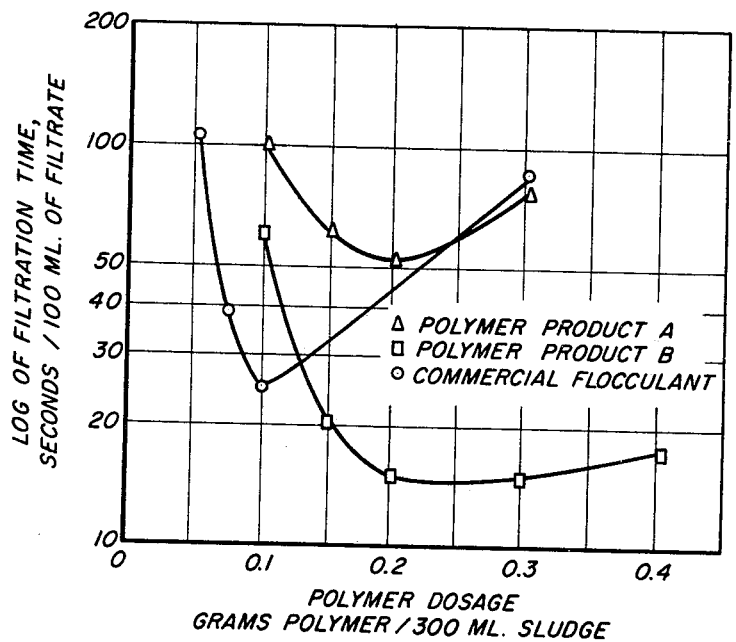

Products A and B were evaluated in the sludge dewatering-filtration test (supra) on a typical digested sludge (5% solids) from a local (Westport, Conn.) municipal sewage treating plant. A commercial polyamine flocculant was also tested as standard. Several polymer dosages were used in the tests and the logs of the times required for 100 ml. of filtrate to be collected vs. the polymer dosages were plotted. The resulting curves are shown in FIGURE 2. As will be seen from the curves, at the most effective dosage for both products (0.2 gram per 300 ml. of sludge) Product A gave a filtration rate of 52 seconds, whereas the rate for Product B was only 15 seconds (i.e., approximately three and one-half times faster). The maximum rate for the commercial flocculant, on the other hand, was 25 seconds (at 0.1 gram per 300 ml. of sludge).

It is seen then that for the obtainment of a superior flocculant, representative of this invention, the reaction must be advanced to the extent prescribed herein, i.e., substantially to the point of incipient gelation.

EXAMPLE 4

In this example the procedure of Example 2 was followed, except that a 5 mole percent excess of epichlorohydrin was employed in the reaction. Upon testing the polymer product in the sludge dewatering-filtration test the optimum dosage and filtration rate were equivalent to those for the polymer product of Example 2.

EXAMPLE 5

The procedure of Example 2 was again followed, but in this instance a 5 mole percent excess of methylamine was used. With this ratio of reactants the advancement of the reaction appeared somewhat slower. To speed the reaction a slightly higher pH was used (i.e., more sodium hydroxide was added). Here again, on testing the polymer product the dosages and rates obtained were similar to those for Examples 2 and 4.

As indicated hereinbefore, the polymer of the invention is a highly effective flocculant for the settling and/or dewatering of various industrial waste and processing waters. This is illustrated by the following example.

EXAMPLE 6

Samples of water suspensions of various types of ore and mineral solids, 1000 ml. in volume in graduated cylinders, were treated with the polymer of Example 2. The polymer, as a 0.1% solution in water, was added to and mixed with each suspension by agitation with a perforated disc plunger. The suspended solids, flocculated by the action of the added compound, settled in the graduates. The time required for the solids to settle from the 1000 ml. graduation level to the 600 ml. graduation level was noted and compared to the time observed for a control sample of each suspension to which none of the compound of the polymer was added. The results of such flocculation-settling tests on the various suspensions are summarized in Table I.

TABLE I

| Suspension treated | Polymer of Example 2 added as flocculant | | Control, no flocculant added |
|---|---|---|---|
| | Dosage, p.p.m. | Settling time, seconds | |
| Effluent from iron ore processing; 2.6% solids | 1.0 | 30.9 | (1) |
| Silica (−200 mesh); 15% solids | 2.0 | 180.8 | 405.6 |
| Coal plant refuse slimes; 1.25% solids | 4.0 | 178.1 | (1) |
| Copper ore flotation tailings; 6.45% solids | 4.0 | 221.8 | 1960 |
| Hydrated clay; 5% solids | 4.0 | 193.8 | 612.9 |
| Fine slate; 5% solids | 2.0 | 41.2 | 168.6 |
| Precipitate from neutralization of acidic coal mine waters; 0.5% solids | 2.0 | 93.1 | 263.5 |
| Uranium ore leach residue; 20% solids | 4.0 | 387.2 | (1) |

1 No flocculation-settling observed over 15 minutes.

The data in the table demonstrate the marked improvements in floculation and settling rates provided by the polymer of the invention. In Buchner funnel filtration tests conducted on the above suspensions, it was found that the filtration rates thereof were improved 45–125% by treatment with the polymer of Example 2, as above described.

I claim:
1. A process for flocculating aqueous suspensions of finely divided solids which comprises treating the suspensions with a water-soluble, cationic, cross-linked polymer produced by the process which comprises reacting methylamine with epichlorohydrin and advancing the reaction in one or more stages, under alkaline conditions in the presence of water, substantially to the point of incipient gelation of the reaction mixture; the amount of water present during the advancement in the one stage, or in the final stage where more than one stage is employed, being such that the final polymer solids content of the reaction mixture is from about 10% to about 30%.

2. The process of claim 1 wherein the suspension treated is a sewage sludge.

3. The process of claim 1 wherein the suspension treated is a mineral suspension.

4. The process of claim 1 wherein the suspension treated is an ore suspension.

References Cited

UNITED STATES PATENTS 1,977,252 10/1934 Stallmann.
3,131,144 4/1964 Nagan _____ 210—54
3,248,353 4/1966 Coscia.

MICHAEL E. ROGERS, Primary Examiner

U.S. Cl. X.R.

260—2, 29.2